(No Model.)
D. LOGAN.
DEVICE FOR SETTING AND JOINTING SAW TEETH.
No. 308,082. Patented Nov. 18, 1884.
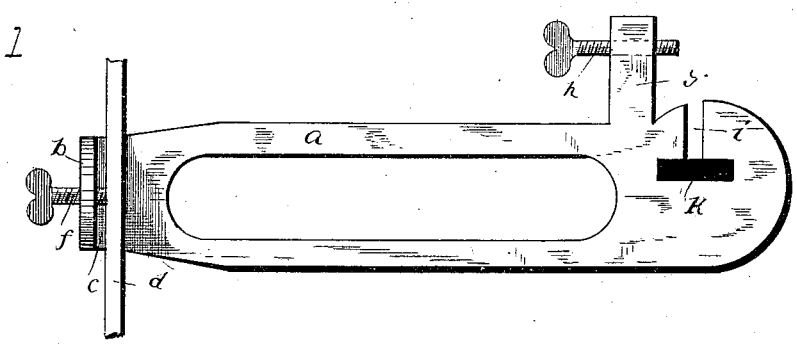
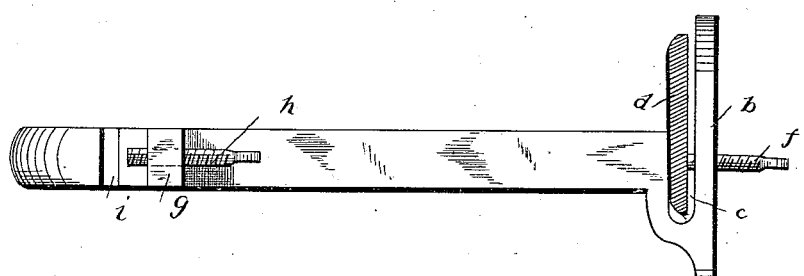
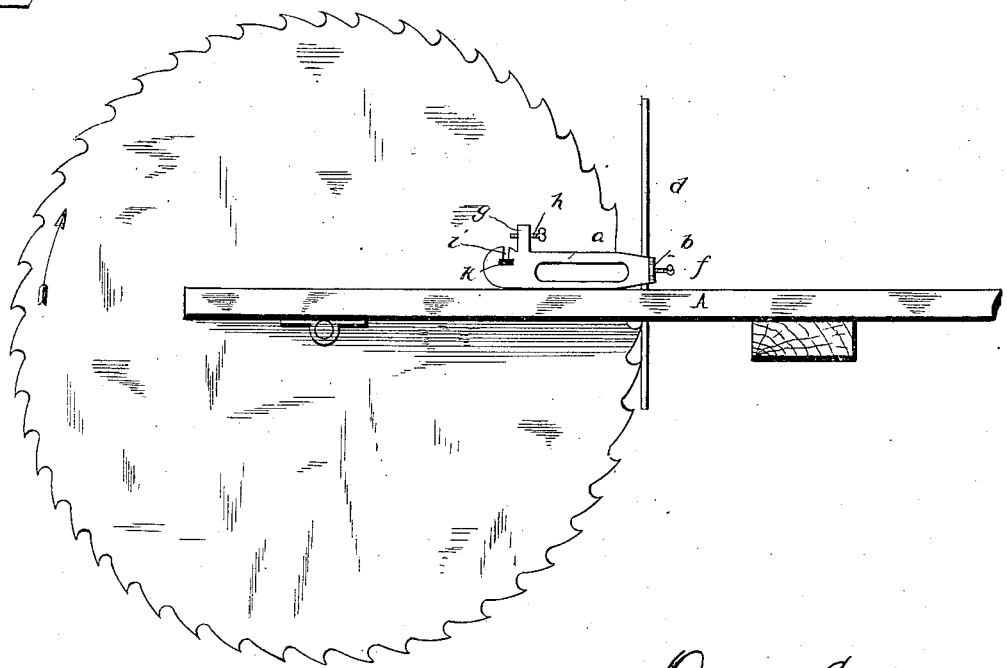
WITNESSES
F. L. Ourand
E. J. Siggers
David Logan
INVENTOR
by C. A. Snow & Co.
Attorneys

UNITED STATES PATENT OFFICE.

DAVID LOGAN, OF HARTSTOWN, PENNSYLVANIA.

DEVICE FOR SETTING AND JOINTING SAW-TEETH.

SPECIFICATION forming part of Letters Patent No. 308,082, dated November 18, 1884.

Application filed March 5, 1884. (No model.)

*To all whom it may concern:*

Be it known that I, DAVID LOGAN, a citizen of the United States, residing at Hartstown, in the county of Crawford and State of Pennsylvania, have invented a new and useful Saw Jointer and Set, of which the following is a specification, reference being had to the accompanying drawings.

This invention has relation to saw-jointers and saw-sets combined; and it consists in the construction and novel arrangement of parts, as will be hereinafter fully described, and particularly pointed out in the claim appended.

Figure 1 is a front elevation of a combined saw-jointer and saw-set embodying the improvements of my invention. Fig. 2 is an edge view; and Fig. 3 is a view showing the jointer applied to a circular saw.

Referring by letter to the accompanying drawings, $a$ designates the stock of the combined jointer and setter for crosscut and circular saws.

$b$ designates the horizontal top plate or bearing, beneath which is a recess or receptacle, $c$, in which the file $d$ rests, and is secured by a set-screw, $f$, when the implement is used as a saw-jointer. The file when in place in the recess $c$ forms a right angle with the vertical face of the stock $a$, as shown. The middle portion of the stock $a$ is open in order to make the implement sufficiently light.

Near the lower end of the stock $a$, from one edge of the same, an arm, $g$, projects, and is provided with a set-screw, $h$, which is employed in connection with the saw-setting portion of the implement, and is used to regulate the pitch of the set to be given to the saw-teeth. A short distance below the arm $g$ the stock $a$ is provided with a recess, $i$, which is made in the edge of the stock parallel with the arm $g$, and is provided at its inner end with a rubber cushion, $k$, which is intended to prevent dulling of the saw-teeth while they are being set.

To joint the teeth of a crosscut-saw, place the face of the stock against the side of the saw and rest the file upon the points of the saw-teeth and move the jointer forward. This operation will not only make the teeth equal in length, but will make them square on the edge.

To joint a circular saw it should be revolved slowly backward with the teeth against the file.

To set the teeth of the saw, the set-screw $h$ is adjusted to give the proper inclination or pitch to the set, the stock is held in the hand, and the tooth of the saw to be set is entered into the recess $i$, the point against the cushion, and by pressing down upon the stock the tooth is bent over until the point of the set-screw strikes the saw-plate, when the set will be given uniformly to alternate teeth. Then apply the set in the same manner to the teeth on the opposite side of the saw.

As saws are ordinarily, filed fully one-third of the teeth do not cut at all on account of their unevenness in length, and those that do cut are uneven in length and do not cut to their fullest capacity. By my arrangement I am enabled to joint the saw perfectly, and therefore get the fullest cutting capacity with one-third less expenditure of power.

This device is simple and complete. It is inexpensive, and by its use the greatest accuracy can be attained in jointing and setting saw-teeth, while the cutting capacity of most saws is increased by it thirty per cent.

To joint a circular lumber-saw, the jointer is laid upon a slitted plank, A, and then pressed up by the hands against the side and edge of the saw, the plank of course resting on the head-block and the saw-frame, as shown.

Saw setting and jointing devices have been made prior to my invention—for instance, see Patent No. 272,625, of February 20, 1883, where the tool is provided with a transverse slot at one end, a depressed portion near this end provided with a longitudinal slot for jointing rakers, and a set-screw between said jointer for the rakers, and a transverse slot in the under face of the other end provided with a set-screw to form another jointer; and see, also, Patent No. 128,718, of July 9, 1872, where a strap-socket provided with wings, one of which forms an angle, is provided with a transverse slot, and the anvil with a set-screw for setting the teeth of a saw is secured to a saw-handle by which to wrench the set, is shown. I disclaim both of said constructions.

Having thus fully described my invention, what I claim as new, and desire to secure by Letters Patent of the United States, is—

The tool or implement for jointing and setting saws, having the horizontal top plate, *b*, at one end, next to which is the recess *c*, in which the file is held by the set-screw *f*, the arm *g*, extending from the edge of the stock *a* near the other end having the set-screw *h* passed through it in the direction of the length of the stock, with the point of said screw *h* toward the end of the stock nearest said arm *g*, and the transverse recess *i* near the arm *g*, said recess *i* being provided at its inner end with a rubber cushion, *k*, as shown and described.

In testimony that I claim the foregoing as my own I have hereto affixed my signature in presence of two witnesses.

DAVID LOGAN.

Witnesses:
GEO. W. ADAMS,
S. J. LOGAN.